Dec. 27, 1927.
E. B. FEATHERSTONE
HIGH FREQUENCY COIL
Filed Nov. 13, 1922
1,653,951
3 Sheets-Sheet 1
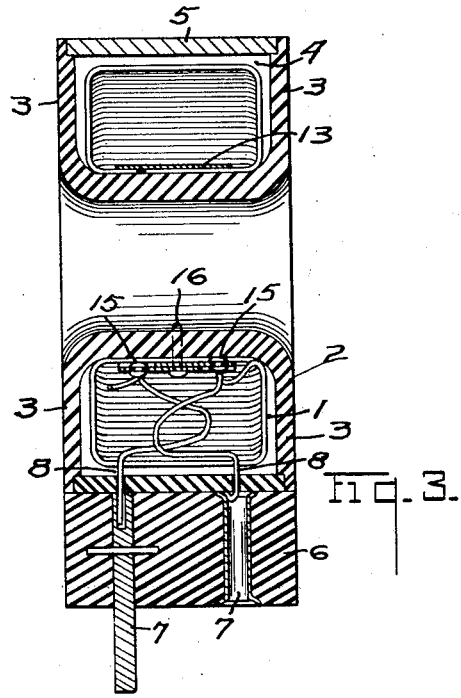
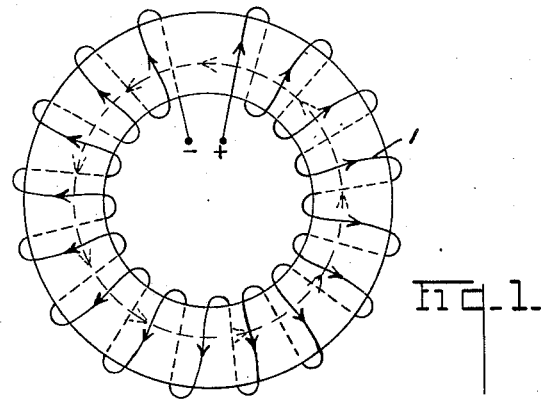
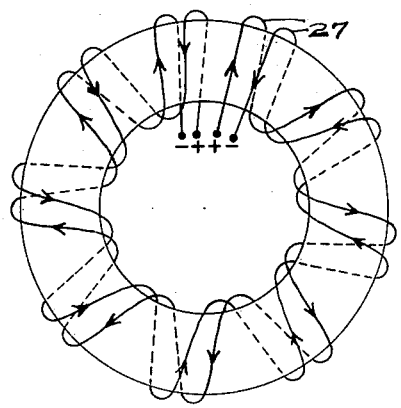
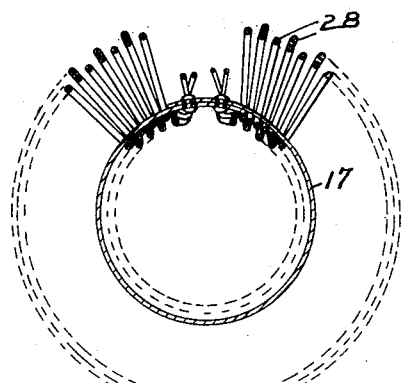
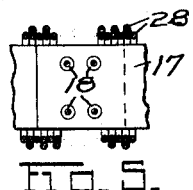
INVENTOR
Edward B. Featherstone
by
Owen, Owen & Crampton

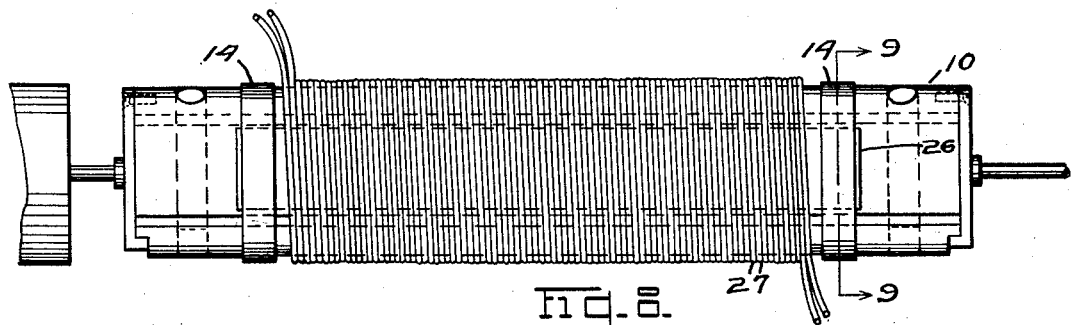
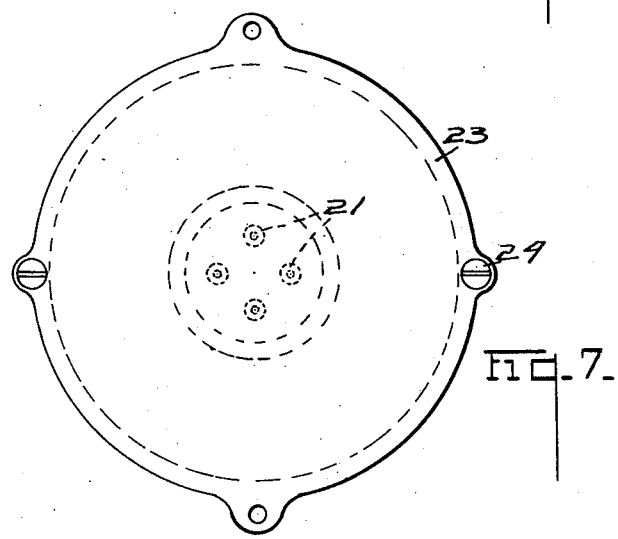
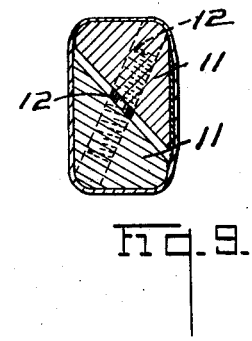
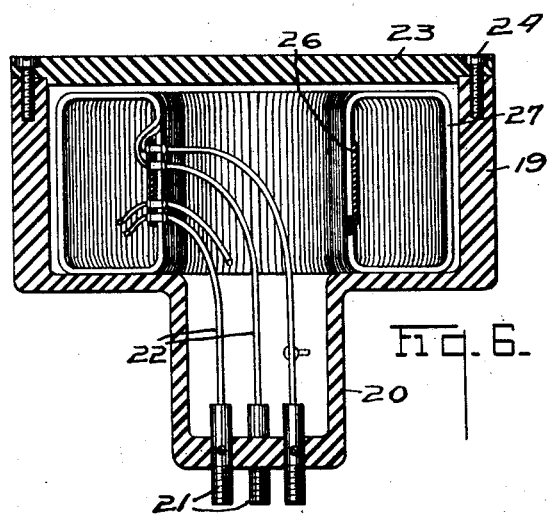

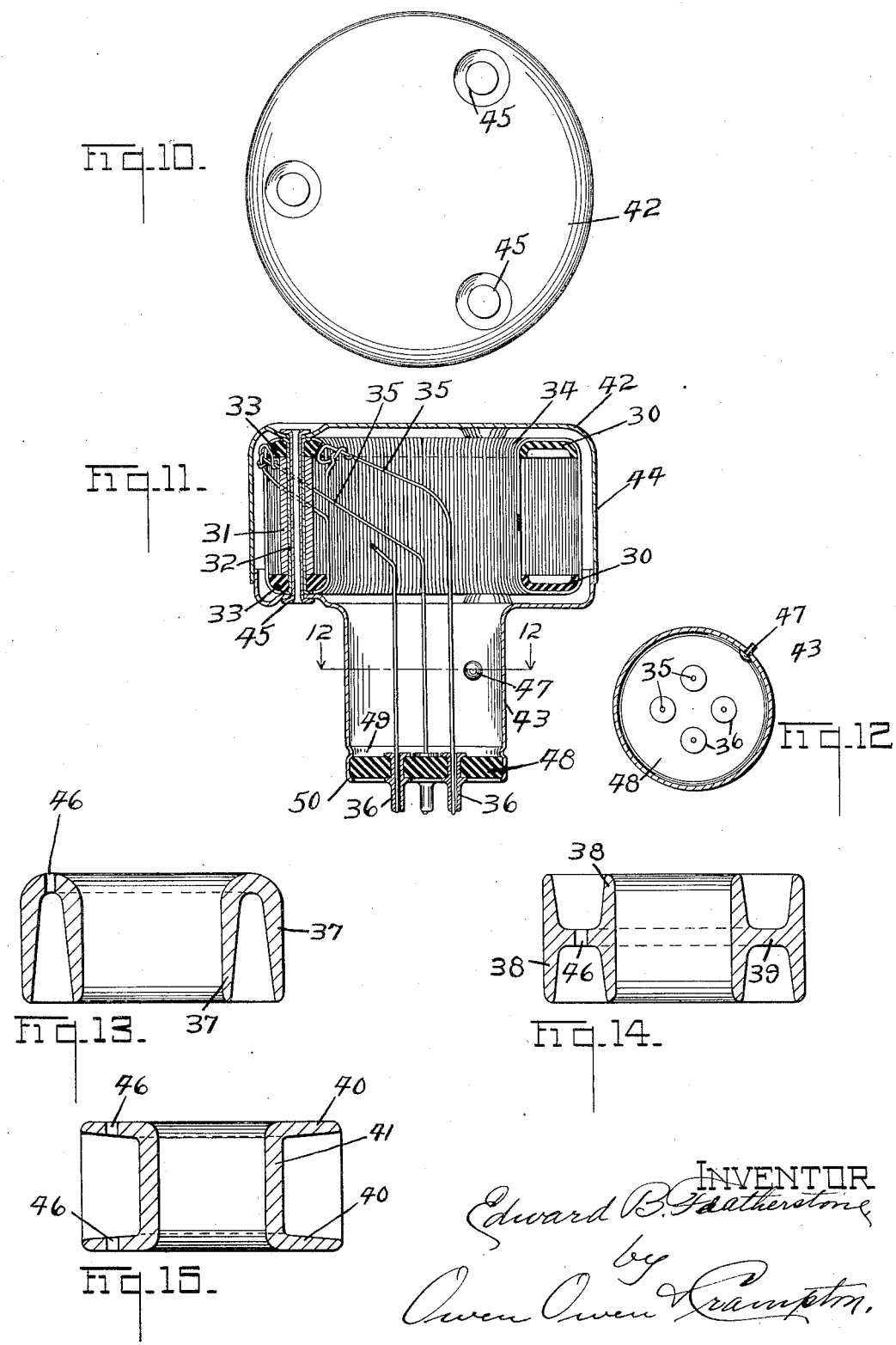

Patented Dec. 27, 1927.

1,653,951

UNITED STATES PATENT OFFICE.

EDWARD B. FEATHERSTONE, OF TOLEDO, OHIO, ASSIGNOR TO THE W. G. NAGEL ELECTRIC COMPANY, OF TOLEDO, OHIO, A CORPORATION OF OHIO.

HIGH-FREQUENCY COIL.

Application filed November 13, 1922. Serial No. 600,647.

My invention relates to an improved high frequency coil that may be easily constructed and so that the relative positions of the turns of the coil will be maintained, while the coil is in use. It also has for its object to so construct the coil that connections may be readily established with an external circuit. A further object of the invention is to so construct the coil that it will be unaffected by fields from foreign sources and also so that there will be no stray fields from the coil itself.

A further object of the invention is to provide a plurality of such coils which are so located relative to each other that electric energy may be transformed thereby and wherein the mutual inductance and capacitance between the coils will produce the maximum cooperative effects.

It is an established fact in the radio electrical art that in the ordinary types of inductance coils great trouble is experienced due to incidental inductive actions between coils and other parts of the circuits or conductive bodies in proximity thereto that cause undesired "feed back" effects with accompanying distortion, oscillation and loss of efficiency. My improved coil is of a toroidal form with the result that the flux path is entirely within the coil and there can be practically no external of stray field to produce effects by induction upon other conductors. Likewise, since by reason of its form, there is no point of entrance into the magnetic circuit of the coil, it cannot pick up stray fields from other sources.

The inductance coils of the general electric art introduce a capacitive reactance in their circuits as well as a purely inductive reactance. At very low frequencies, such as 60 cycles per second, the former is not of serious import, but since capacitive reactance is an inverse function of the frequency, the capacitive reactance becomes very low at radio frequencies and thus produces a short circuit for the potential across the inductance coil. In any case there will be a phase shifting action due to the 180° vector relation existing between the inductive and capacitive reactances, this action producing resonant phenomena which may not be desirable. The distributive capacitance of my improved coil is very low because, first, the winding is in a single layer and hence the voltage between any two adjacent conductors is that of only one turn, second, the turns are of relatively small radius, hence they present a smaller area of conductor across the dielectric intervening consecutive turns, and third, a lower voltage exists across each turn because of the relatively large number of turns used. These three characteristics each aid in reducing the distributed capacitance of the coil to a very low value. This is also true where banked windings are employed in connection with lower frequency radio currents.

When two or more of my toroidal coils are to be arranged as a transformer of high frequency energy, such coils are wound preferably in either of two ways, first, the consecutive primary turns are juxtaposed to the consecutive secondary turns, thus forming a single layer double winding whose convolutions are alternately primary turns and secondary turns. If more than two coils are employed, a corresponding number of conductors is used. Second, the two or more windings are arranged in superposed single layers, uniformly spacing the turns of each winding as necessary to secure the desired ratio between the number of turns of the different coils.

In either of these arrangements certain definite improvements are obtained. First, there is an increased mutual inductive effect between windings due to the proximity of consecutive turns of each winding. Second, this proximity produces an increased capacitive effect between turns of the different coils which is in such a direction as to reinforce the inductive effect. Third, this proximity also further decreases the stray electric and magnetic fields of the transformer since the energy transfer is accomplished, not between coils as a whole, but between individual turns of these coils. There is, therefore, no accumulation of strong magnetic and electric fields within the transformer and hence there are practically no resulting stray fields.

The invention may be embodied in coils used in connection with radio communication at high frequencies. It may be used in inductance coils for tuning or loading purposes or as intervalve coupling agencies in radio-frequency amplifier circuits.

The invention may be contained in coils that differ in the details of their construction. To illustrate a practical application of the invention I have selected two or more coils as examples and shall describe them hereinafter. The coils selected are shown in the accompanying drawings.

Figure 1 of the drawings illustrates diagrammatically the toroidal form of an inductance coil. Fig. 2 illustrates conventionally the toroidal form of a transformer wherein the ratio of the number of the turns is 1:1. Fig. 3 is a sectional view of a coil of the form shown in Fig. 1, and its support. Fig. 4 illustrates a part of the transformer having a 2:1 relation and showing in a conventional way the manner in which the turns of the coils are held in their relative positions. Fig. 5 shows the means for connecting the ends of the coils to terminals. This figure shows another arrangement of the coils. Fig. 6 illustrates a sectional view of a transformer and its support, the coils being of the form illustrated conventionally in Fig. 2. Fig. 7 is a top view of the device illustrated in Fig. 6. Fig. 8 illustrates a collapsible mandrel on which the coils may be wound. Fig. 9 illustrates a sectional view taken on the line 9—9 indicated in Fig. 8. Fig. 10 illustrates a top view of a case for enclosing a modified coil containing the invention. Fig. 11 illustrates a sectional view of the coil and the case. Fig. 12 illustrates a sectional view taken on the line 12—12 indicated in Fig. 11. Figs. 13, 14 and 15 illustrate modified forms of cores for supporting coils such as illustrated in Fig. 11. Fig. 13 illustrates a core having a U-shaped cross section. Fig. 14 illustrates a core having an H-shaped cross section. Fig. 15 illustrates a channeled core.

The coils when used as inductance coils or transformer coils are wound on a suitable mandrel in their formation and then shaped to the toroidal form. Any form of mandrel may be used which will permit the removal of the coils together with a device used for securing the turns of the coils in their desired relation after they have been removed from the mandrel. When the inductance coil is formed, the magnetic field within the coil is closed upon itself, so as to produce a field throughout the coil and thus form a circuitous flux that is maintained within the turns of the coil. The coil may have any cross-section such as circular, oblong or square and may be contained in any suitable support. In Fig. 3 the coil 1 is mounted on a spool 2 having flanges 3 between which is formed a channel 4 of a size sufficient to maintain the coil. The coils are enclosed by means of a strip 5. The block 6 is provided with suitable terminals 7 to which the ends of the wires of the coils are connected by means of wires 8.

In the formation of the coil, the coil is wound on a mandrel 10. In order that the mandrel 10 may be collapsible, it is formed of two parts 11 which are secured in definite relation by means of the right and left handed screws 12 whereby rotation of the screws will cause the parts 11 to recede from each other or be drawn together. The mandrel may be mounted in any suitable winding machine and the carriage may be used for guiding the wire as the coils are formed on the mandrel to produce a desired number of turns within a given length of the mandrel.

In order to secure the coils in the desired position, after they are removed from the mandrel, a flexible insulating strip, such as strip 13, of sheet insulating material is first secured in position on the mandrel such as by the elastic bands 14. The elastic bands 14 are passed around the ends of the insulating material and the mandrel and thus the insulating strip is held in position during the winding of the coil. The coil is then wound on the mandrel over the insulating strip. Portions of each of the turns of the coils are then secured together by suitable cementitious material. The cementitious material may operate to secure merely portions of the turns located on one side of the mandrel together or it may operate to secure the said portions together and to the insulating strip.

The mandrel is then collapsed by rotating the screws 12 in the proper directions and the coil having portions of its turns secured in their proper relations by the cementitious material is removed. The coil is then bent to the toroidal form, the cemented portions being located on the inner circumference of the toroid and placed in its support. The ends of the coil are connected to the terminals, such as the terminals 7, by suitable wires.

If the strip is secured by the cementitious material to the coil, the ends of the strips are provided with hollow rivets 15 to which the ends of the coil are secured and also to which the wires that connect the coils with the terminals of the instrument, may be easily connected, as by soldering. When the coil has been placed in position on the spool it may be secured by the pin 16 that is passed through the ends of the strip 13 and forced into the spool 2. If desired, a cementitious material may be placed around the shank of the spool 2 and thus further secure the coil in position in the spool.

The transformer may be made in substantially the same way, that is, the two wires, when the coils are placed in a single layer, may be fed to the mandrel at the same time and guided by the carriage of the winding machine. When the transformer is formed by using superposed layers the turns of the first layer are first wound on the mandrel and then the turns of the superposed layers, be there two or more such layers, are wound on the preceding layers, the carriage of the winding machine being adjusted to produce the required number of turns in each of the coils to produce the desired ratio of transformation. The turns of the coils 27 of the transformer are secured in their relative positions in the same manner that the turns of the inductance coil described heretofore are secured, as by means of the strip 26 which is covered with a suitable cementitious material. The cementitious material may also secure juxtaposed portions of the turns of the coils or portions of the turns of the coils may be secured by the cementitious material to the sheet insulating strip 26 and to each other. The coils are removed from the mandrel in the same manner as heretofore described and placed in position on their support. The ends of the coils may be secured to the hollow rivets 18 that are used to rivet together the ends of the strips 26, as by soldering or other suitable means. Wires are also secured to the rivets as by soldering and are connected to the terminals.

The transformer coils may be likewise mounted in any suitable support such as in the shell 19 shown in Fig. 6. The shell 19 is provided with a plug portion 20 that will fit into a standard vacuum tube socket. The end of the portion 20 is provided with the terminals 21 that fit the usual contact springs of the socket. The terminals 21 may be threaded so that they may be used as binding posts and connection made by means of nuts that may be threaded onto the terminals to secure lead wires thereto. The terminals 21 are connected to the ends of the wires of the coils by means of the wires 22. The shell 19 may be closed by a cover 23 that is secured by any suitable means, such as by the screws 24.

In Figs. 4 and 5 are shown relative positions that turns of coils may be secured, the coils 28 being placed in a superposed relation to each other.

With reference to the operation of the coils, the current periodically passes through the coil in the direction indicated by the solid arrows, thus producing a closed magnetic field in the direction shown by the dotted arrows. This will prevent any stray fields from the coil and also prevent deleterious effects that might otherwise be caused by fields from other sources. In the form of the coil shown in Fig. 2 where the windings are side by side, the consecutive turns of the primary being placed beside the consecutive turns of the secondary, there is an accumulated capacitive action as between the coils of the transformer and this capacitive effect is cooperative with the inductive effect. Assuming that the instantaneous current is in the direction of the arrows indicated in Fig. 2, and that the signs at the terminals are as indicated, the consecutive turns of one coil will induce in the consecutive turns of the other coil a static charge of opposite potential, that will be also the sign of the electromotive force magnetically induced in such turns. It will also be seen, on examination of the diagram, that the electromotive force thus magnetically and electrostatically induced is multiplied by the number of turns because of their series relation. This produces an exceedingly efficient transformer coil for radio transmission, particularly in view of the fact that the coil is toroidal in shape.

In the form of the coils illustrated in Figs. 4 and 5 the same electrostatic and electromagnetic conditions occur, although the ratio is higher than that of the coils illustrated conventionally in Fig. 2.

The coils may also be shuttle-wound on annular cores, such as those illustrated in Figs. 11, 13, 14 and 15. The core shown in Fig. 11 is provided with two annular members 30 that are secured in spaced relation and in parallel planes by the sleeves 31 and 32. The sleeve 31 is located between the annular members 30 and the sleeves 32 pass through the sleeves 31 and through the members 30 and their ends are turned so as to rivet the members between the ends of the sleeve 31 and the ends of the sleeves 32. The members 30 may be channeled and where the sleeves 31 abut the rings, bosses 33 may be provided that extend across and fill the channel of the rings at the points where the sleeves 31 and 32 are located. The coils 34 are wound on the core that is thus formed and may be formed of the desired number of strands, as in the case of the coil 27 or the coil 28. The terminals of the coils may be connected in any suitable way to the lead wires 35 which are in turn connected with the plug terminals 36.

In place of the core having the annular members 30 the U-shaped core shown in Fig. 13 may be used, or the H type of core shown in Fig. 14, or the channeled type shown in Fig. 15. In Fig. 13 the core is provided with two concentrically arranged flanges 37 that give it the U-shaped cross section. The coils are wound by means of a shuttle, as described in connection with the core illustrated in Fig. 11. In Fig. 14 the core is also provided with concentric flanges 38 that are connected together by means of the web 39 which gives it the H shape cross section. In Fig. 15 the core is provided with a pair of flanges 40 disposed in spaced relation and in substantially parallel planes, their relation being maintained by the cylindrical portion 41.

The cores may be secured in the case 42 which is provided with a plug portion 43. The head 44 of the plug is formed of two parts which are secured together and to the core by means of the tubular rivets 45 which extend through the sleeves 31 and 32 and are spun or riveted over the outside of the parts that form the head 44 of the case. In order to secure the cores shown in Figs. 13, 14 and 15 they are provided with holes 46 through which rivets may be passed in order to secure them in proper position with reference to the parts of the head, such as by means of shoulders and rivets, or by threaded portions, or in any other suitable manner.

The plug portion 43 is provided with the usual pin 47 for securing the plug in position in a socket having a bayonet slot, in the manner well known in the art. The end of the plug 43 is provided with an insulating disk 48 which is secured in position by the inwardly extending bead 49 and the turned end or edge 50 of the plug. The terminals 36 are secured by riveting or spinning the ends and thus clamping the insulating disk 48 between shoulders of the terminals 36 and their spun or riveted ends.

I claim:

1. In an air core radio coil, a coil member, an annulus of insulating material securing portions of each of the turns of the coil together, the coil shaped in substantially toroidal form, and rivets secured to the annulus and connected to the ends of the coil.

2. In an air core radio coil, a coil member, an annulus of insulating material securing portions of each of the turns of the coil together, the coil shaped in substantially toroidal form, and rivets for connecting the ends of the annulus together, the ends of the coil connected to the rivets.

3. In an air core radio coil, a coil member, an annulus of insulating material securing portions of each of the turns of the coil together, the coil shaped in substantially toroidal form, and rivets secured to the annulus and connected to the ends of the coil, a shell for supporting the coil, terminal wires connected to the rivets, the shell having terminals connected to the terminal wires.

4. The method of forming an air core radio coil comprising the steps of placing a strip of insulating material on one face of a mandrel, winding the coil over the mandrel and said strip, removing the mandrel and forming the coil to a substantially toroidal form, whereby the said strip is formed into an annulus and serves to support the turns of the coil.

5. The method of forming an air core radio coil which comprises the steps of placing a strip of flexible insulating material on a mandrel, winding a coil on said mandrel, applying cementitious material to the portions of the coil that lie over the said strip and removing the mandrel whereby said strip serves to support and hold together the adjacent portions of the coil.

6. The method of forming an air core radio coil which comprises the steps of placing a strip of flexible insulating material on a mandrel, winding a coil on said mandrel, applying cementitious material to the portions of the coil that lie over the said strip, removing the mandrel whereby said strip serves to support and hold together the adjacent portions of the coil, and forming said coil and strip to assume a toroidal form and joining the free ends of said strip together.

7. An air core radio coil comprising a coil member shaped in substantially toroidal form, and an annulus of insulating material disposed within the windings of the said coil and lying flat against the inner face of said windings for securing said windings of the coil together.

8. The method of forming an air core radio coil comprising the steps of winding the coil on a mandrel, securing adjacent portions of the turns of the coil together, removing the mandrel, and placing the ends of the coil in proximity to each other, thereby giving the coils a substantially toroidal form.

9. The method of forming an air core radio coil comprising the steps of winding the coil on a straight mandrel, securing adjacent portions of the turns of the coil together and to a strip of insulating material, removing the mandrel, and placing the ends of the coil in proximity to each other, thereby giving the coil a substantially toroidal form and locating the said portions of the turns within the toroidal form.

10. An air core radio coil comprising turns positioned so as to form a toroidal passage within said coil, said passage constituting an air core for the coil.

11. An air core radio coil comprising turns positioned so as to form a toroidal passage within said coil, said passage constituting an air core for the coil, and means whereby portions of said turns are held in fixed relation to each other.

12. An air core radio coil comprising turns positioned so as to form a toroidal passage within said coil, said passage constituting an air core for the coil, and means whereby portions of said turns are held together.

13. An air core radio coil comprising turns positioned so as to form a toroidal passage within said coil, said passage constituting an air core for the coil, and means whereby portions of said turns which lie at the inner periphery are held in fixed relation to each other.

14. An air core radio coil comprising turns positioned so as to form a toroidal passage within said coil, said passage constituting an air core for the coil, and means whereby portions of said turns which lie at the inner periphery are held together.

15. An air core radio coil comprising turns positioned so as to form a toroidal passage within said coil, said passage constituting an air core for the coil, an annulus of insulating material, and means to hold portions of said turns to said annulus.

16. An air core radio coil comprising turns positioned so as to form a toroidal passage within said coil, said passage constituting an air core for the coil, an annulus of insulating material at the inner periphery of the toroid, and means for attaching adjacent portions of said turns to said annulus.

17. An air core radio coil comprising turns positioned so as to form a toroidal passage within said coil, said passage constituting an air core for the coil, an annulus of insulating material at the inner periphery of the toroid and within the same, and means for attaching adjacent portions of said turns to said annulus.

18. An air core radio coil comprising turns positioned so as to form a toroidal passage within said coil, said passage constituting an air core for the coil, an annulus of insulating material, means to hold portions of said turns to said annulus, and members secured to said annulus and connected to the ends of the coil.

19. An air core radio coil comprising turns positioned so as to form a torodial passage within said coil, said passage constituting an air core for the coil, an annulus of insulating material at the inner periphery of the toroid, means for attaching adjacent portions of said turns thereto, and members secured to said annulus and connected to the ends of the coil.

20. An air core radio coil comprising turns positioned so as to form a torodial passage within said coil, said passage constituting an air core for the coil, an annulus of insulating material at the inner periphery of the toroid and within the same, means for attaching adjacent portions of said turns to said annulus, and members secured to said annulus and connected to the ends of the coil.

21. An air core radio coil comprising turns positioned so as to form a toroidal passage within the said coil, said passage constituting an air core for the coil, an annulus of insulating material, means to hold portions of said turns to said annulus, and cementing means to hold the ends of the annulus together and connected to the ends of the coil.

22. An air core radio coil comprising turns positioned so as to form a toroidal passage within the said coil said passage constituting an air core for the coil, an annulus of insulating material at the inner periphery of the toroid, cementing means for attaching adjacent portions of said turns thereto, and means to hold the ends of the annulus together and connected to the ends of the coil.

23. An air core radio coil comprising turns positioned so as to form a toroidal passage within the said coil said passage constituting an air core for the coil, an annulus of insulating material at the inner periphery of the toroid and within the same, cementing means for attaching adjacent portions of said coil to said annulus, and means to hold the ends of the annulus together and connected to the ends of the coil.

24. An air core radio coil comprising turns positioned so as to form a torodial passage wthin the said coil, said passage constituting an air core for the coil, an annulus of insulating material, cementing means to hold portions of said turns to said annulus, and rivets holding the ends of the annulus together and connected to the ends of the coil.

25. An air core radio coil comprising turns positioned so as to form a torodial passage within the said coil, said passage constituting an air core for the coil, an annulus of insulating material at the inner periphery of the toroid, cementing means for attaching adjacent portions of said turns thereto, and rivets holding the ends of the annulus together and connected to the ends of the coil.

26. An air core radio coil comprising turns positioned so as to form a toroidal passage within the said coil, said passage constituting an air core for the coil, an annulus of insulating material at the inner periphery of the toroid and within the same, cementing means for attaching adjacent portions of said coil to said annulus, and rivets holding the ends of the annulus together and connected to the ends of the coil.

27. The method of forming a toroidal air core radio coil which consists in winding a coil, securing adjacent portions of the turns together, and bending the coil into a toroidal form to place the ends thereof in proximity to each other, whereby said secured portions lie within the toroidal form thus produced.

28. The method of forming a toroidal air core radio coil which consists in winding a coil, securing adjacent portions of the turns together, and bending the coil into a toroidal form having said secured portions at the inner periphery of the toroidal form to place the ends of said coil in proximity to each other.

29. The method of forming a toroidal air core radio coil which consists in winding a coil, securing adjacent portions of the turns to a strip, and bending the coil into a toroidal form to place the ends thereof in proximity to each other, whereby said secured portions lie within the toroidal form thus produced.

30. The method of forming a toroidal air core radio coil which consists in winding a coil, securing adjacent portions of the turns to a strip, and bending the coil into a toroidal form having said strip at the inner periphery thereof.

31. The method of forming an air core radio coil which consists in placing a straight strip longitudinally upon the surface of a straight mandrel, said strip being narrow with respect to the dimensions of said mandrel, winding a coil over said mandrel and strip, cementing portions of the turns which are in contact with said strip to each other and to said strip, removing the mandrel, and bending the coil into a toroidal form having said strip adjacent the inner periphery of said toroidal form.

32. A transformer for use with radio frequency currents, said transformer having a non-magnetic core and comprising a pair of coils electromagnetically coupled together, one of said coils being of toroidal form, whereby the magnetic field of the toroidal coil is confined within said coil.

33. A transformer for use with radio frequency currents, said transformer having a non-magnetic core and comprising a pair of coils electromagnetically and electrostatically coupled together, one of said coils being of toroidal form.

34. A transformer for use in radio frequency amplification having a non-magnetic core and comprising a coil of toroidal form adapted to be tuned by a variable condenser and another coil electromagnetically coupled therewith.

35. A transformer for use with radio frequency currents, said transformer having a non-magnetic core and comprising a pair of coils electromagnetically coupled together, one of said coils being of toroidal form, whereby the magnetic field of the toroidal coil is confined within said coil, the second coil having a plurality of turns, said second coil being of less circumferential dimension than the first coil.

36. A transformer for use with radio frequency currents, said transformer having a non-magnetic core and comprising a pair of coils electromagnetically coupled together, one of said coils being of toroidal form, whereby the magnetic field of the toroidal coil is confined within said coil, the second coil having a plurality of turns, said second coil being of less circumferential dimension than the first coil, and electrostatically coupled therewith.

37. A transformer for use with radio frequency currents, said transformer having a non-magnetic core and comprising a pair of coils electromagnetically coupled together, one of said coils being of toroidal form and the other coil having turns of a similar cross sectional shape.

38. A radio-frequency transformer having a primary coil and a secondary coil, said coils having the windings thereof disposed substantially helically with respect to the circumference of a circle, said circumference constituting the axis of a closed air-core.

39. An induction coil comprising a primary winding bent longitudinally into a circular form, and a secondary winding concentrically disposed thereabout.

40. A coupling transformer for high frequency electrical circuits comprising in combination a pair of windings, one of said windings being constructed substantially in the shape of a toroid with the ends thereof substantially adjacent each other, and the other of said windings comprising a coil positioned along an arc of said first mentioned coil and having an axis in common with the axis of said first mentioned coil.

41. A coupling transformer for high frequency electrical circuits comprising in combination a pair of windings, one of said windings being constructed substantially in the shape of a toroid with the ends thereof substantially adjacent each other, means for supporting the turns of said winding in spaced relationship and with respect to a fixed surface, and the other of said windings being positioned along an arcuate portion of said first mentioned winding and having its axis in common with the axis of said first mentioned winding.

42. A transformer for use with radio frequency currents, said transformer having an air core and comprising a pair of toroidal coils electromagnetically coupled together, whereby the magnetic field is confined within the coils, the turns of one coil being of less diameter than of the other and the turns of the first coil being located inside the other coil.

43. A transformer for use with radio frequency currents, said transformer having an air core and comprising a pair of toroidal coils electromagnetically coupled together, whereby the magnetic field is confined within the coils, the turns of one coil being of less diameter than the turns of the other, the turns of the first coil being located inside the other coil.

44. An air core transformer comprising series of turns positioned so as to form a toroidal passage therewithin, said passage constituting an air core.

45. An air core tranformer comprising series of turns positioned so as to form a toroidal passage therewithin, said passage constituting an air core, and mean whereby portions of said turns are held in fixed relation to each other.

46. An air core transformer comprising series of turns positioned so as to form a toroidal passage therewithin, said passage constituting an air core, and means whereby portions of said turns are held together.

47. An air core transformer comprising series of turns positioned so as to form a toroidal passage therewithin, said passage constituting an air core, and means whereby portions of said turns which lie at the inner periphery are held in fixed relation to each other.

48. An air core transformer comprising series of turns positioned so as to form a toroidal passage therewithin, said passage constituting an air core, and means whereby portions of said turns which lie at the inner periphery are held together.

49. An air core transformer comprising series of turns positioned so as to form a toroidal passage therewithin, said passage constituting an air core, an annulus of insulating material, and means to hold portions of said turns to said annulus.

50. An air core transformer comprising series of turns positioned so as to form a toroidal passage therewithin, said passage constituting an air core, an annulus of insulating material at the inner periphery of the toroid, and means for attaching adjacent portions of said turns to said annulus.

51. An air core transformer comprising series of turns positioned so as to form a toroidal passage therewithin, said passage constituting an air core, an annulus of insulating material at the inner periphery of the toroid and within the same, and means for attaching adjacent portions of said turns to said annulus.

52. An air core transformer comprising series of turns positioned so as to form a toroidal passage therewithin, said passage constituting an air core, an annulus of insulating material, means to hold portions of said turns to said annulus, and members secured to said annulus and connected to the ends of the series of turns.

53. An air core transformer comprising series of turns positioned so as to form a toroidal passage therewithin, said passage constituting an air core, an annulus of insulating material at the inner periphery of the toroid, means for attaching adjacent portions of said turns thereto, and members secured to said annulus and connected to the ends of the series of turns.

54. An air core transformer comprising series of turns positioned so as to form a toroidal passage therewithin, said passage constituting an air core, an annulus of insulating material at the inner periphery of the toroid and within the same, means for attaching adjacent portions of said turns to said annulus, and members secured to said annulus and connected to the series of turns.

55. An air core transformer comprising series of turns positioned so as to form a toroidal passage therewithin, said passage constituting an air core, an annulus of insulating material, means to hold portions of said turns to said annulus, and cementing means to hold the ends of the annulus together and connected to the ends of the series of turns.

56. An air core transformer comprising series of turns positioned so as to form a toroidal passage therewithin, said passage constituting an air core, an annulus of insulating material at the inner periphery of the toroid, cementing means for attaching adjacent portions of said turns thereto, and means to hold the ends of the annulus together and connected to the ends of the series of turns.

57. An air core transformer comprising series of turns positioned so as to form a toroidal passage therewithin, said passage constituting an air core, an annulus of insulating material at the inner periphery of the toroid and within the same, cementing means for attaching adjacent portions of said coil to said annulus, and means to hold the ends of the annulus together and connected to the ends of the series of turns.

58. An air core transformer comprising series of turns positioned so as to form a toroidal passage therewithin, said passage constituting an air core, an annulus of insulating material, cementing means to hold portions of said turns to said annulus, and rivets holding the ends of the annulus together and connected to the ends of the series of turns.

59. An air core transformer comprising series of turns positioned so as to form a toroidal passage therewithin, said passage constituting an air core, an annulus of insulating material at the inner periphery of the toroid, and cementing means for attaching adjacent portions of said turns thereto.

60. An air core transformer comprising series of turns positioned so as to form a toroidal passage therewithin, said passage constituting an air core, an annulus of insulating material at the inner periphery of the toroid and within the same, and cementing means for attaching adjacent portions of said turns thereto.

61. The method of forming a toroidal air core transformer which consists in winding coils, securing adjacent portions of the turns together, and bending the transformer into toroidal form.

62. The method of forming a toroidal air core transformer which consists in winding coils, securing adjacent portions of the turns together, and bending the transformer into toroidal form to position the secured portions at the inner periphery of the toroid.

63. The method of forming a toroidal air core transformer which consists in winding coils over a strip, cementing adjacent portions of said coils to said strip, and bending the so wound coils into toroidal form.

64. The method of forming a toroidal air core transformer which consists in winding coils over a strip, cementing adjacent portions of said coils to said strip, and bending the so wound coils into toroidal form to position the secured portions at the inner periphery of the toroid.

65. A coupling transformer for high frequency electrical circuits comprising in combination a pair of windings, one of said windings being constructed substantially in the shape of a toroid with the ends thereof substantially adjacent each other, and means tangential to the turns of said first mentioned winding for supporting said turns in spaced relation, and the other of said windings being formed along an arcuate portion of said first mentioned winding with its axis in common with the axis of said first mentioned winding.

66. A coupling transformer for high frequency electrical circuits comprising in combination a pair of windings, one of said windings being constructed substantially in the shape of a toroid with the ends thereof substantially adjacent each other, and means tangential to the turns of said first mentioned winding and extending between the turns thereof for supporting said turns in spaced relationship along substantially radial lines from the center of said windings, and the other of said windings being positioned along an arcuate portion of said first mentioned winding with its axis in common with the axis of said first mentioned winding.

67. A transformer for use with radio frequency currents, said transformer having a non-magnetic core and comprising a pair of coils electromagnetically coupled together, one of said coils being of toroidal form, whereby the magnetic field of the toroidal coil is confined within said coil, the second coil having a plurality of turns, said second coil being of less circumferential dimension than the first coil, and electrostatically coupled therewith.

68. An induction coil as described in claim 39, and in which said primary and secondary windings comprise non-parallel turns of wire.

69. A transformer for use with radio frequency currents, said transformer having a non-magnetic core and comprising a pair of coils electromagnetically and electrostatically coupled together, one of said coils being of toroidal form, said coils being so placed with respect to each other that a predetermined amount of electrostatic capacity exists between the coils.

70. A transformer for use in radio frequency amplification having a non-magnetic core and comprising a coil of toroidal form adapted to be tuned by a variable condenser and another coil interleaved with the toroidal coil.

71. A transformer for use in radio frequency amplification having a non-magnetic core and comprising a secondary coil of toroidal form adapted to be tuned by a variable condenser and a primary winding interleaved partially around the circumference of the toroidal coil.

72. A transformer for use with radio frequency currents, said transformer having a non-magnetic core and comprising a pair of coils electromagnetically coupled together, one of said coils being of toroidal form, whereby the magnetic field of the toroidal coil is confined within said coil, the second coil electromagnetically coupled therewith and located circumferentially so that a predetermined amount of electrostatic capacity exists between said coils.

73. A transformer for high frequency electric currents having a coil of toroidal form and another coil, the turns of which are of substantially the same diameter as those of the toroidal coil and interleaved therewith for at least a part of the circumference of the toroidal coil, whereby said coils are electromagnetically coupled.

74. A transformer for use with radio frequency currents, said transformer having a non-magnetic core and comprising a pair of coils electromagnetically coupled together, one of said coils being of toroidal form, whereby the magnetic field of the toroidal coil is confined within said coil, the second coil comprising a plurality of turns and conforming to the shape of the first mentioned coil, said second coil being electromagnetically coupled therewith and so located circumferentially with respect to the terminals of the first mentioned coil as to give the desired degree of stability when used in connection with an electron tube amplifier.

75. A transformer for use with radio frequency currents, said transformer having a non-magnetic core and comprising a pair of coils electromagnetically coupled together, one of said coils being of toroidal form, whereby the magnetic field of the toroidal coil is confined within said coil, the second coil comprising a plurality of turns of substantially the same diameter as those of the first mentioned coil and interleaved therewith, said second coil being electromagnetically coupled therewith and so located circumferentially with respect to the terminals of the first mentioned coil as to give the desired degree of stability when used in connection with an electron tube amplifier.

76. A transformer for use with radio frequency currents, said transformer having a non-magnetic core and comprising a pair of coils electromagnetically coupled together, one of said coils being or toroidal form, whereby the magnetic field of the toroidal coil is confined within said coil, and another coil so located circumferentially with respect to the terminals of the first as to permit a predetermined amount of regeneration to take place through the elements of an electron tube used in said amplifier.

77. As a new article of manufacture, an induction coil comprising a coil of non-parallel turns of wire bent to form a toroid, and a completely enclosing coil of non-parallel turns of wire concentrically disposed about said first mentioned coil.

78. A transformer for use with radio frequency currents, said transformer having a non-magnetic core and comprising a pair of coils electromagnetically coupled together, one of said coils being of toroidal form, whereby the magnetic field of the toroidal coil is confined within said coil.

79. A transformer for use with radio frequency currents, said transformer having a non-magnetic core and comprising a pair of coils electromagnetically and electrostatically coupled together, one of said coils being toroidal form.

80. A transformer for use with radio frequency currents, said transformer having a non-magnetic core and comprising a pair of coils electromagnetically and electrostatically coupled together, one of said coils being of toroidal form, said coils being so placed with respect to each other that a predetermined amount of electrostatic capacity exists between the coils.

81. A transformer for use in radio frequency amplification having a non-magnetic core and comprising a coil of toroidal form adapted to be tuned by a variable condenser and another coil electromagnetically coupled therewith.

82. A transformer for use in radio frequency amplification having a non-magnetic core and comprising a coil of toroidal form adapted to be tuned by a variable condenser and another coil of toroidal form electromagnetically coupled therewith.

83. A transformer for use with radio frequency currents, said transformer having a non-magnetic core and comprising a pair of coils electromagnetically coupled together, one of said coils being of toroidal form, the electrostatic capacity between the coils being so adjusted as to permit a predetermined amount of regeneration to take place through the elements of an electron tube used in said amplifier.

84. A transformer for use with radio frequency currents, said transformer having an air core and comprising a pair of toroidal coils electromagnetically coupled together, whereby the magnetic field is confined within the coils.

85. A transformer for use with radio frequency currents, said transformer having an air core and comprising a pair of toroidal coils electromagnetically coupled together, whereby the magnetic field is confined within the coils, the turns of one coil being of less diameter than the turns of the other, the turns of the first coil being located inside the other coil, and the coil having turns of smaller diameter having fewer turns than the coil having turns of larger diameter.

In testimony whereof I have hereunto subscribed my name to this specification.

EDWARD B. FEATHERSTONE.